Figure 1:
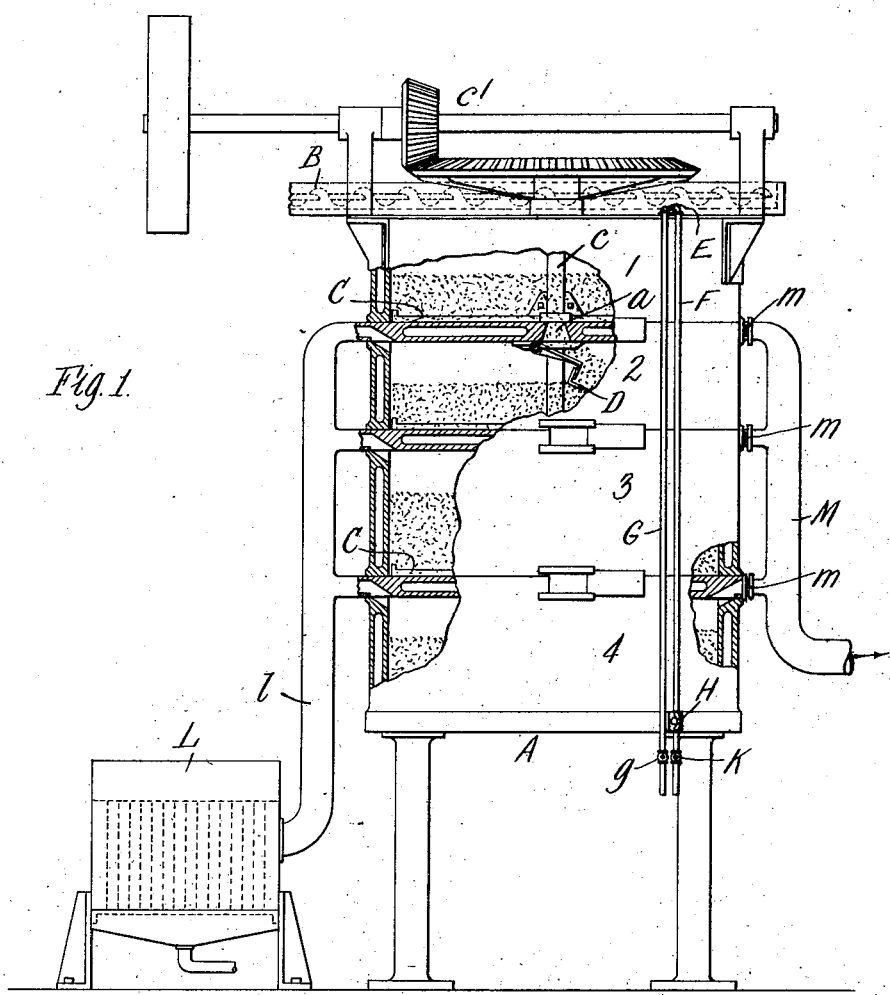

A. W. FRENCH.
APPARATUS FOR AND METHOD OF COOKING OIL BEARING MATERIAL.
APPLICATION FILED JULY 31, 1911.

1,158,476.

Patented Nov. 2, 1915.

Witnesses.

Inventor.
Alfred W. French
by Wilhelm & Parker
Attorneys.

A. W. FRENCH.
APPARATUS FOR AND METHOD OF COOKING OIL BEARING MATERIAL.
APPLICATION FILED JULY 31, 1911.
1,158,476. Patented Nov. 2, 1915.
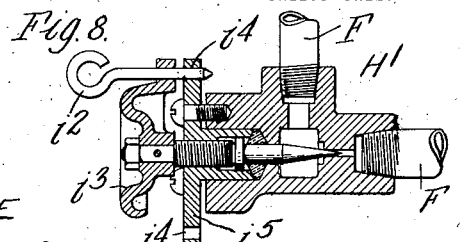
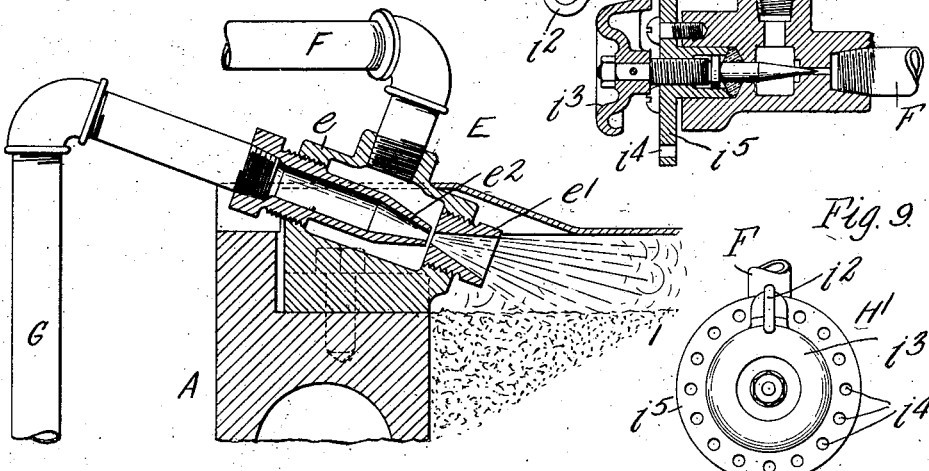
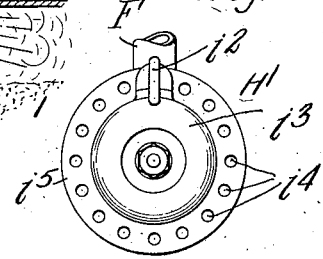
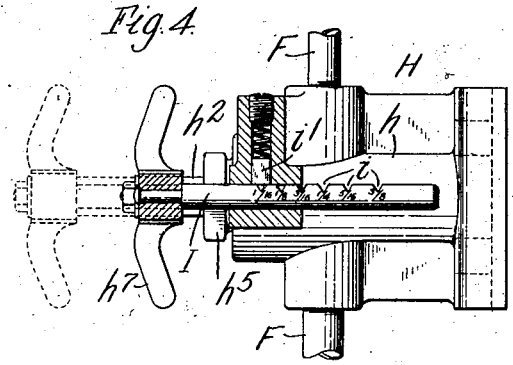
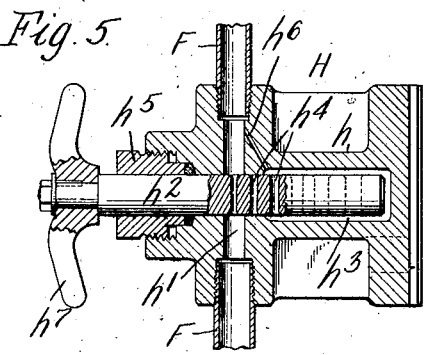
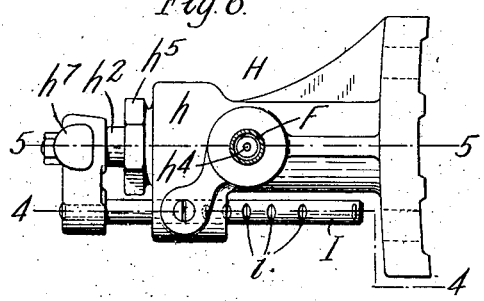
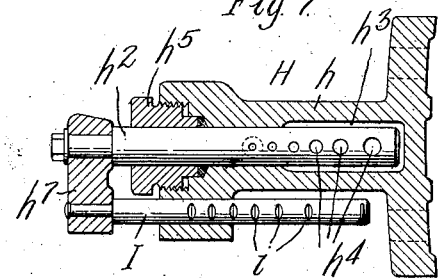
Witnesses.
A. G. Dimond.
George H. Walter
Inventor.
Alfred W. French
by Wilhelm Parker & Heus
Attorneys.

UNITED STATES PATENT OFFICE.

ALFRED WILLARD FRENCH, OF PIQUA, OHIO.

APPARATUS FOR AND METHOD OF COOKING OIL-BEARING MATERIAL.

1,158,476.        Specification of Letters Patent.        Patented Nov. 2, 1915.

Application filed July 31, 1911. Serial No. 641,587.

*To all whom it may concern:*

Be it known that I, ALFRED W. FRENCH, a citizen of the United States, residing at Piqua, in the county of Miami and State of Ohio, have invented a new and useful Improvement in Apparatus for and Methods of Cooking Oil-Bearing Material, of which the following is a specification.

This invention relates to steam cookers for oil bearing meal, and more particularly to means for moistening and regulating the moisture of the meal in continuous or automatic cookers of the sort disclosed, for example, in Patent No. 909,773, granted January 12, 1909, to M. W. Faherty, assignor to myself, in which the meal is fed to the cooker more or less continuously and its passage from one to another of the kettles of the cooker is automatically controlled, so as to regulate the time required for cooking the meal and thus cook all of the meal uniformly.

With the old style cookers, in which the meal is cooked in one kettle until done, it has been customary to pour in a pail of water, more or less, as required, to each kettleful of meal and also introduce live steam, but this method cannot be used in automatic cookers in which the meal is fed to the cooker more or less continuously and the cooking is continued in the successive kettles. The meal should have an abundant supply of water uniformly distributed when it first enters the cooker. If it does not, the dry portions of the meal may scorch, causing red oil, and also impairing the yield of oil. If, however, the meal contains ample moisture uniformly distributed, this moisture, at all times, during the cooking process, is a good transmitter of heat and the entire mass of meal is brought to a cooking temperature very much quicker than if the meal is dry. It has been attempted to supply the water by a pipe, but with the ordinary valve there is no way of accurately gaging the amount of water introduced, as a very slight increase in the opening of the valve makes a great difference in the quantity of water introduced, and since the water is not finely divided or uniformly distributed throughout the meal, it forms water balls in the meal. The introduction of water and steam into the conveyer which feeds the meal to the cooker has also been tried with imperfect success, as in this way also the water is not uniformly distributed, and furthermore this gums up and clogs the conveyer.

One object of this invention is to provide a meal cooker with moistening means which will equally distribute the moisture and uniformly moisten all of the meal, and the association therewith of means whereby the amount of moisture in the meal can be definitely regulated as required, depending upon the condition of the meal being treated.

Another object is to provide an efficient apparatus and process whereby the oil-bearing meal can be cooked in a continuous manner and the moisture conditions thereof definitely regulated as required.

According to this invention water is discharged into the top or first kettle of the cooker in the form of a fine spray, preferably by means of a steam jet or injector, which also introduces live steam into the meal, and providing the water supply pipe with a regulating valve by which the quantity of water discharged can be regulated with precision. As the meal is fed to the top kettle substantially continuously or gradually and is caused to circulate in the kettle by the usual rotary stirrer, each new portion of the meal as it enters is brought to the spraying device and moistened, all portions of the meal being thus uniformly moistened to the required degree.

The discharge of the meal from kettle to kettle is automatically regulated so as to control the quantity of meal in the kettles and the time required for its passage through the cooker, and provision is made for exhausting moisture from or regulating the moisture in one or more of the kettles to secure the required moisture conditions in the meal.

Figure 2:
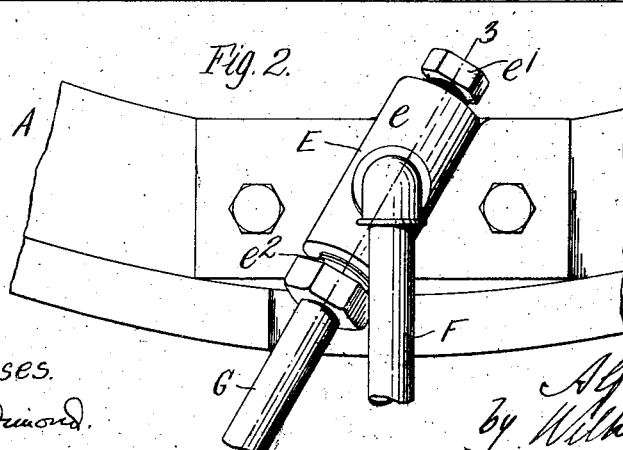

In the accompanying drawings consisting of two sheets: Figure 1 is an elevation partly in section of a steam cooker provided with moistening means embodying the invention. Fig. 2 is a plan view on an enlarged scale of the moistening device. Fig. 3 is a sectional elevation thereof in line 3—3, Fig. 2. Fig. 4 is an enlarged elevation partly in section in line 4—4, Fig. 6, of the supply regulating valve for the water. Fig. 5 is a sectional elevation thereof in line 5—5, Fig. 6. Fig. 6 is a plan view thereof. Fig. 7 is a sectional plan thereof. Figs. 8 and 9 are respectively a sectional elevation and an end view of a regulating valve of modified construction.

Like reference characters refer to like parts in the several figures.

A, Fig. 1, represents the cooker which comprises a series of heating kettles or chambers 1, 2, 3, 4, arranged in a descending series so that the meal can discharge by gravity through the discharge opening $a$ in the bottom of one kettle into the next kettle below.

In the cooker shown four kettles are employed arranged one directly over and upon the other, but the kettles can be arranged in any other way, so long as the arrangement is such that the meal can discharge from one kettle to another, for instance, they can be arranged in a stepped series, as shown in the above mentioned patent, and any suitable number of kettles or chambers of any suitable construction can be used. The kettles shown have hollow bottoms and side walls forming steam chambers which are supplied with steam in the usual way for cooking or heating the meal.

The meal is fed to the top kettle by the usual screw conveyer B, or other suitable feed device, by which the meal is fed to the top kettle a little at a time more or less continuously or at substantially regular intervals.

C represents the usual rotary stirrers or scrapers, consisting of arms projecting laterally in the lower portions of the kettles from a vertical central shaft $c$ which is driven by suitable mechanism $c'$. These stirrers cause the meal to rotate or circulate in the kettles and to discharge properly through the bottom discharge openings thereof.

Any suitable means may be employed for automatically controlling the discharge of the meal from one kettle to the next, so that a substantially uniform quantity of meal is maintained in each kettle and a definite period of time is required for the passage of the meal through the cooker. For instance, the discharge opening $a$ of each of the kettles, 1, 2 & 3, is provided with a controlling gate D, such as disclosed in said patent. The gate for each kettle is hinged on the under side thereof and is adapted to open by gravity and to be closed to prevent the discharge of the meal from said kettle by the meal accumulating in the next lower kettle, into which the gate depends. The rotation or circulation of the meal in the kettles caused by the rotation of the stirrers tends to close the gates as the level of the meal rises in the kettles, the arrangement and proportion of the parts being such that when the meal has accumulated to a predetermined level in each kettle, it will close the gate for the next kettle above and stop the discharge of meal therefrom.

The construction and operation of the cooker as thus far described is known.

E represents a water spraying device or injector which is arranged to discharge water in a finely divided spray or atomized condition into the top kettle on the surface of the meal, so that as the meal is fed to the kettle it is brought by the rotation of the body of meal in the kettle into position to be moistened by the spray of water. The water is preferably atomized or sprayed by a steam nozzle or injector which also introduces live steam into the meal. An injector or spraying device of any suitable construction may be employed, that shown comprising a body or shell $e$ provided with a discharge nozzle $e'$ and a steam nozzle $e^2$ which extends into the shell and terminates therein adjacent to the inner end of the discharge nozzle.

F represents a water supply pipe connecting with the shell $e$ and G represents a steam supply pipe connecting with the steam nozzle. These pipes extend downwardly outside of the cooker to a point within convenient reach of the operative where the steam pipe is provided with a valve $g$ of any usual or suitable sort for controlling the steam supply and the water pipe is provided with a valve H for regulating or gaging the quantity of water discharged by the spraying device.

The valve H shown in Figs. 4–7, comprises a casing $h$ provided with a water passage $h'$ joining the portions of the pipe F which are connected to opposite sides of the valve case or body and a movable valve rod $h^2$ which extends across the water passage in a chamber $h^3$ in the case intersecting said passage, and is provided with a series of holes $h^4$ of different diameters, any one of which is adapted to be placed in register with the water passage $h'$ by moving the valve rod. The valve rod passes through a suitable stuffing box $h^5$ to prevent the leakage of water and the inner end of the valve rod chamber $h^3$ is connected by a small drain hole $h^6$ with the water passage to prevent back pressure on the valve rod. The holes in the valve rod are of different sizes such that when the smallest hole is placed in register with the water passage, the minimum amount of water will be supplied and when the largest hole is placed in register with the passage, the maximum amount of water needed will be supplied, the remaining holes being adapted to supply regulated quantities between the minimum and maximum amounts. The valve rod is operated by a suitable handle $h^7$.

A suitable device is preferably provided for indicating the position of the valve rod. The indicating device shown consists of a rod I connected to the valve handle and passing through a guide lug at one side of the valve case, and provided with notches $i$ in which a spring latch or bolt $i'$ is adapted to engage for holding the valve rod in its different adjustments. The notches in the rod I are spaced similarly to the holes $h^4$ in the valve rod, so that when the spring latch engages in one or another of the notches, the corresponding hole in the valve rod will be held in register with the water passage $h'$ in the valve case. The notches in the indicating rod I are preferably marked, as shown, to indicate the size of the corresponding holes in the valve rod.

The regulating valve can be of different construction, for example: Figs. 8 and 9 show a valve $H'$ of different construction for the same purpose. This is a screw or needle valve having a screw-threaded stem provided with a tapering end adapted to be screwed more or less into or out of the water passage of the valve casing for regulating the volume of water discharged. For indicating the adjustment of the valve and holding it in the required position to deliver a definite volume of water, a pin $i^2$ is provided, which passes through a hole in the valve handle $i^3$ and is adapted to be inserted into any one of a series of holes $i^4$ in a flange $i^5$ secured to the valve casing. The required volume of water will pass the valve by turning the valve and placing the holding pin $i^2$ in the appropriate hole $i^4$. By means of either of these valves H or $H'$, the quantity of water supplied to the meal can be regulated with absolute certainty and great accuracy, so as to give just the amount of moisture required and as the water is finely sprayed or atomized and the meal is fed to the kettle continuously or in regulated quantities which are carried beneath the spray device by the rotation of the meal in the kettle, the water is equally distributed throughout the meal and all of the meal is uniformly moistened. The water pipe F is also preferably provided with a valve K of ordinary construction for shutting off the water when it is not needed.

L represents an air heater of any suitable construction and $l$ a pipe for delivering the heated or dry air from the heater to the kettles 2, 3 and 4 of the cooker, and M represents an exhaust pipe connecting these kettles with a fan or air exhausting device. The branches of the exhaust pipe M which connect with the kettles are provided with dampers $m$ for regulating the exhaust from the several kettles as required. No air supply and exhaust means are required for the top kettle 1.

If the meal or seed being cooked is very wet, no extra moisture need be supplied, and the moistening device E is not used, but the hot air supply and air exhaust are used, if necessary, to carry off the excess moisture. If on the other hand, the meal is dry the moistening or spraying device is used to wet the meal, more water being preferably supplied than is left in the cake, in order to obtain the benefit of the heat transmitting effect of the water and to prevent the meal from scorching, and the surplus moisture is removed by means of the hot air supply and air exhausting means. The means described thus enable the meal to be moistened, or the moisture removed, as required, and to just the extent necessary to produce the best results.

I claim as my invention:

1. The combination of a plurality of heating kettles or chambers for oil-bearing material or the like provided with heating means and having discharge openings arranged for the material to discharge from one chamber to another, means which operate automatically to regulate the discharge of material from chamber to chamber for maintaining substantially predetermined quantities of material in the chambers, means for spraying water in a finely divided condition to the material, means for definitely regulating the supply of spray water, and means for removing moisture from at least a portion of said chambers for definitely regulating the moisture in the material.

2. The herein described continuous process of cooking oil-bearing material consisting in heating the material in a series of chambers arranged to permit the material to discharge from one chamber to another, causing material to discharge from one chamber to another in regulated order, whereby the quantity of material in the chambers and the time required for the passage of the material through the chambers is definitely regulated, spraying water in a finely divided condition to the material, and positively regulating the moisture in the material during the cooking process.

3. The herein described continuous process of cooking oil-bearing material consisting in heating the material in a series of chambers arranged to permit the material to discharge from one chamber to another, causing material to discharge from one chamber to another in regulated order, whereby the quantity of material in the chambers and the time required for the passage of the material through the chambers is definitely regulated, supplying moisture to the material in the first chamber, and positively regulating the moisture in at least a portion of the remaining chambers.

4. The herein described continuous process of cooking oil-bearing material consisting in heating the material in a series of chambers arranged to permit the material to discharge from one chamber to another, causing material to discharge from one chamber to another in regulated order, whereby the quantitiy of material in the chambers and the time required for the passage of the material through the chambers is definitely regulated, spraying water in a finely divided condition into the first chamber and exhausting vapor arising from the material in at least a portion of said chambers to positively regulate the moisture in the material.

5. The combination with a cooker for oil bearing material comprising a kettle, means for feeding the material gradually to the kettle, and means for causing the material to circulate in the kettle, of a device for spraying water into said kettle to moisten the material, means for regulating the supply of water, and means independent of the source of heat for the material in the cooker for removing excess moisture from the meal, substantially as set forth.

6. The herein described method of cooking oil-bearing material, consisting of heating the material in a kettle, spraying water in a finely divided condition into the kettle on the material in excess of the amount required in the cooked material, and then removing the excess moisture by exhausting from the kettle the vapor arising from the material, substantially as set forth.

Witness my hand this 14 day of July, 1911.

ALFRED WILLARD FRENCH.

Witnesses:
C. B. JAMISON,
C. B. UPTON.